United States Patent
Choi et al.

(10) Patent No.: US 7,327,401 B2
(45) Date of Patent: Feb. 5, 2008

(54) DISPLAY SYNCHRONIZATION SIGNAL GENERATION APPARATUS AND METHOD IN ANALOG VIDEO SIGNAL RECEIVER

(75) Inventors: Young-hun Choi, Yongin-si (KR); Byeong-jin Kim, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 522 days.

(21) Appl. No.: 10/942,969

(22) Filed: Sep. 17, 2004

(65) Prior Publication Data

US 2005/0062887 A1    Mar. 24, 2005

(30) Foreign Application Priority Data

Sep. 20, 2003   (KR) .................. 10-2003-0065404

(51) Int. Cl.
  *H03L 7/00*   (2006.01)
(52) U.S. Cl. ................ 348/547; 348/536; 348/548
(58) Field of Classification Search ........... 348/547, 348/548, 545, 536, 537, 529, 511, 500
  See application file for complete search history.

(56) References Cited

U.S. PATENT DOCUMENTS

| | | | | |
|---|---|---|---|---|
| 3,935,388 | A | * | 1/1976 | Brinkmann ........... 348/548 |
| 4,224,639 | A | * | 9/1980 | Belisomi ............. 348/548 |
| 4,227,214 | A | * | 10/1980 | Morito et al. ........ 348/548 |
| 6,356,212 | B1 | | 3/2002 | Lyons et al. |
| 6,538,656 | B1 | | 3/2003 | Cheung et al. |

FOREIGN PATENT DOCUMENTS

| | | | |
|---|---|---|---|
| JP | 06-138834 | A | 5/1994 |
| JP | 96-28516 | A | 7/1996 |
| JP | 2000-056729 | A | 2/2000 |
| JP | 2001-195023 | A | 7/2001 |
| JP | 2001-257664 | A | 9/2001 |
| JP | 2002-15527 | A | 1/2002 |
| JP | 2002-311929 | A | 10/2002 |
| KR | 1998-013257 | A | 4/1998 |
| KR | 1999-018314 | A | 3/1999 |
| KR | 1999-0063287 | A | 7/1999 |
| WO | WO 03/003718 | | 1/2003 |
| WO | WO 03/043341 | A1 | 5/2003 |

* cited by examiner

*Primary Examiner*—M. Lee
(74) *Attorney, Agent, or Firm*—Sughrue Mion, PLLC

(57) ABSTRACT

A display synchronization signal generation apparatus and method, which make it possible to display a stable image irrespective of changes of horizontal and vertical frequencies of a received analog video signal in an analog video signal receiver. The display synchronization signal generation apparatus includes a detection unit, a change amount conversion unit, and a vertical synchronization signal generation unit. The detection unit detects an amount of change in a vertical period of an input video signal by comparing current and previous vertical periods of the input video signal. The change amount conversion unit converts the detected amount of change into the amount of change in a vertical period of a video signal to be displayed, using the current vertical period and the total number of pixels per frame. The vertical synchronization signal generation unit generates a vertical synchronization signal of the video signal to be displayed.

15 Claims, 6 Drawing Sheets

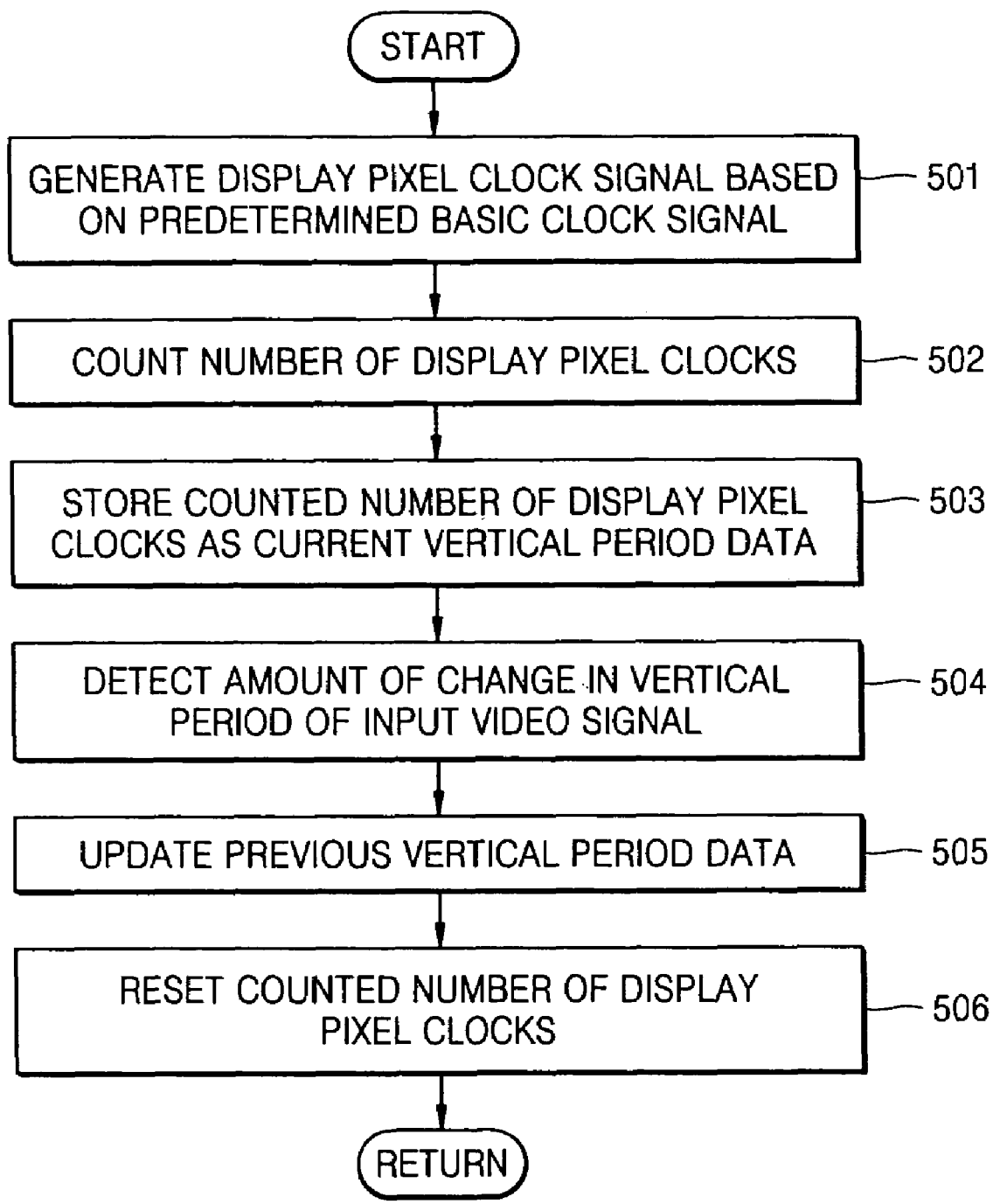

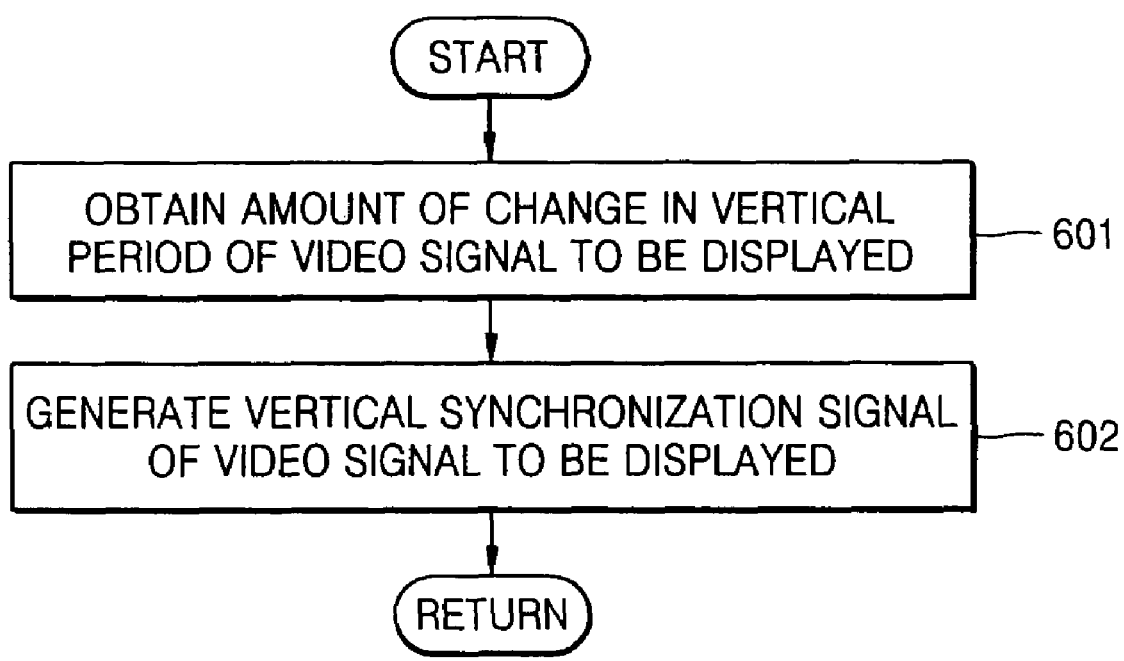

DISPLAY SYNCHRONIZATION SIGNAL GENERATION APPARATUS AND METHOD IN ANALOG VIDEO SIGNAL RECEIVER

CROSS-REFERENCE TO RELATED APPLICATION

This application claims priority from Korean Patent Application No. 2003-65404, filed on Sep. 20, 2003, in the Korean Intellectual Property Office, the disclosure of which is incorporated herein in its entirety by reference.

BACKGROUND OF THE INVENTION

1. Field of the Invention

The present invention relates to a display synchronization signal generation apparatus and method in an analog video signal receiver, and more particularly, to a display synchronization signal generation apparatus and method that make it possible to display a state image irrespective of changes of horizontal and vertical frequencies of received analog video signals.

2. Description of the Related Art

An analog video signal receiver can receive analog video signals such as composite video burst synchronization (CVBS) signals, S-video signals, and component signals.

The CVBS signals can be received through a tuner included in the analog video signal receiver or through a video cassette recorder (VCR) connection terminal. The S-video signals can be input to the analog video signal receiver through a terminal that can be connected to a device such as an S-video home system (S-VHS) VCR or a digital versatile disc (DVD) that has S-video output. Each of the S-video signals consists of a luminance (Y) component signal and a color (C) component signal. The component signals take the form of RGB (Red, Green, Blue) signals, or Y/Pb/Pr or Y/Cb/Cr signals, and can be input to the analog video signal receiver through a terminal connectable to a device such as a computer.

Horizontal and vertical frequencies of these analog video signals may be changed by their environment. Particularly in the case of VCRs, changes of the horizontal and vertical frequencies of the analog video signals are significantly dependent on recording method and deck speed.

In the analog video signal receiver, horizontal and vertical frequencies of video signals to be displayed can be changed only by a predetermined vertical or horizontal mode. The predetermined vertical mode is defined in terms of the total number of lines per frame, and the predetermined horizontal mode is defined in terms of the total number of pixels per frame.

However, a frequency of a display pixel clock signal used in the analog video signal receiver is fixed. The display pixel clock signal is used to output received analog video signals according to timing suitable for a display device.

Since the analog video signal receiver uses a display pixel clock signal of a fixed frequency, when the horizontal and vertical frequencies of the received analog video signals are changed, discrepancy may be caused between transmission speeds of the received analog video signals and display speeds of the video signals to be displayed. Such discrepancy leads to an unstable display screen, such as a flickering or blank screen.

SUMMARY OF THE INVENTION

A display synchronization signal generation apparatus and method are provided that make it possible to display a stable image irrespective of changes of horizontal and vertical frequencies of received analog video signals in an analog video signal receiver.

A display synchronization signal generation apparatus and method are provided that make it possible to display a stable image irrespective of changes of horizontal and vertical frequencies of the received analog video signals by varying vertical frequencies of video signals to be displayed according to vertical frequencies of received analog video signals in an analog video signal receiver.

According to an exemplary embodiment of the present invention, there is provided a display synchronization signal generation apparatus including a detection unit, a change amount conversion unit, and a vertical synchronization signal generation unit. The detection unit detects an amount of change in a vertical period of an input video signal by comparing a current vertical period and a previous vertical period of the input video signal. The change amount conversion unit converts the amount of change detected by the detection unit into an amount of change in a vertical period of a video signal to be displayed, by using the current vertical period of the input video signal and the total number of pixels per frame. The vertical synchronization signal generation unit generates a vertical synchronization signal of the video signal to be displayed, by using the result of changing the total number of pixels per frame by the amount of change that has been converted by the change amount conversion unit.

According to another exemplary embodiment of the present invention, there is provided a display synchronization signal generation apparatus including a pixel clock signal generation unit, a horizontal synchronization signal generation unit, a detection unit, a change amount conversion unit, and a vertical synchronization signal generation unit. The pixel clock signal generation unit generates a display pixel clock signal based on a basic clock signal. The horizontal synchronization signal generation unit generates a horizontal synchronization signal that varies according to the display pixel clock signal generated by the pixel clock signal generation unit, and outputs the generated horizontal synchronization signal as a horizontal synchronization signal of a video signal to be displayed. The detection unit detects a current vertical period of an input video signal by using the display pixel clock signal generated by the pixel clock signal generation unit, compares the current vertical period and a previous vertical period of the input video signal, and detects an amount of change in a vertical period of the input video signal. The change amount conversion unit converts the amount of change detected by the detection unit into an amount of change in a vertical period of an video signal to be displayed, by using the current vertical period of the input video signal and the total number of pixels per frame. The vertical synchronization signal generation unit generates a vertical synchronization signal of the video signal to be displayed, by using the result of changing the total number of pixels per frame by the amount of change that has been converted by the change amount conversion unit.

According to another exemplary embodiment of the present invention, there is provided a display synchronization signal generation method in a video signal receiver, the display synchronization signal generation method including: detecting a difference between a current vertical period and a previous vertical period of an input video signal as an amount of change in a vertical period of the input video signal; converting the detected amount of change into an amount of change in a vertical period of a video signal to be displayed, by using the current vertical period and the total number of pixels per frame; and generating a vertical synchronization signal of the video signal to be displayed, based on the result of changing the total number of pixels per frame by the amount of change in the vertical period of the video signal to be displayed.

According to another exemplary embodiment of the present invention, there is provided a display synchronization signal generation method comprising: generating a display pixel clock signal based on a basic clock signal; counting the number of display pixel clocks generated during the activation of a vertical synchronization signal of an input video signal; storing the counted number of display pixel clocks as current vertical data every time the vertical synchronization signal of the input image is input; detecting the amount of change in a vertical period of the input video signal by comparing the current vertical period data and previous vertical period data of the input video signal; converting the detected amount of change into the amount of change in a vertical period of a video signal to be displayed, by using the current vertical period data and the total number of pixels per frame; generating a vertical synchronization signal of the video signal to be displayed, using the result of changing the total number of pixels per frame by the converted amount of change; and generating a horizontal synchronization signal that varies according to the display pixel clock signal, as a horizontal synchronization signal of the video signal to be displayed.

BRIEF DESCRIPTION OF THE DRAWINGS

The above and other aspects and advantages of the present invention will become more apparent by describing in detail exemplary embodiments thereof with reference to the attached drawings in which:

FIG. 5 is a flowchart of a procedure for detecting the amount of change in a vertical period of a received analog video signal, in a display synchronization signal generation method according to an exemplary embodiment of the present invention; and FIG. 6 is a flowchart of a procedure for generating a vertical synchronization signal of a video signal to be displayed, in a display synchronization signal generation method according to an exemplary embodiment of the present invention.

Figure 1:
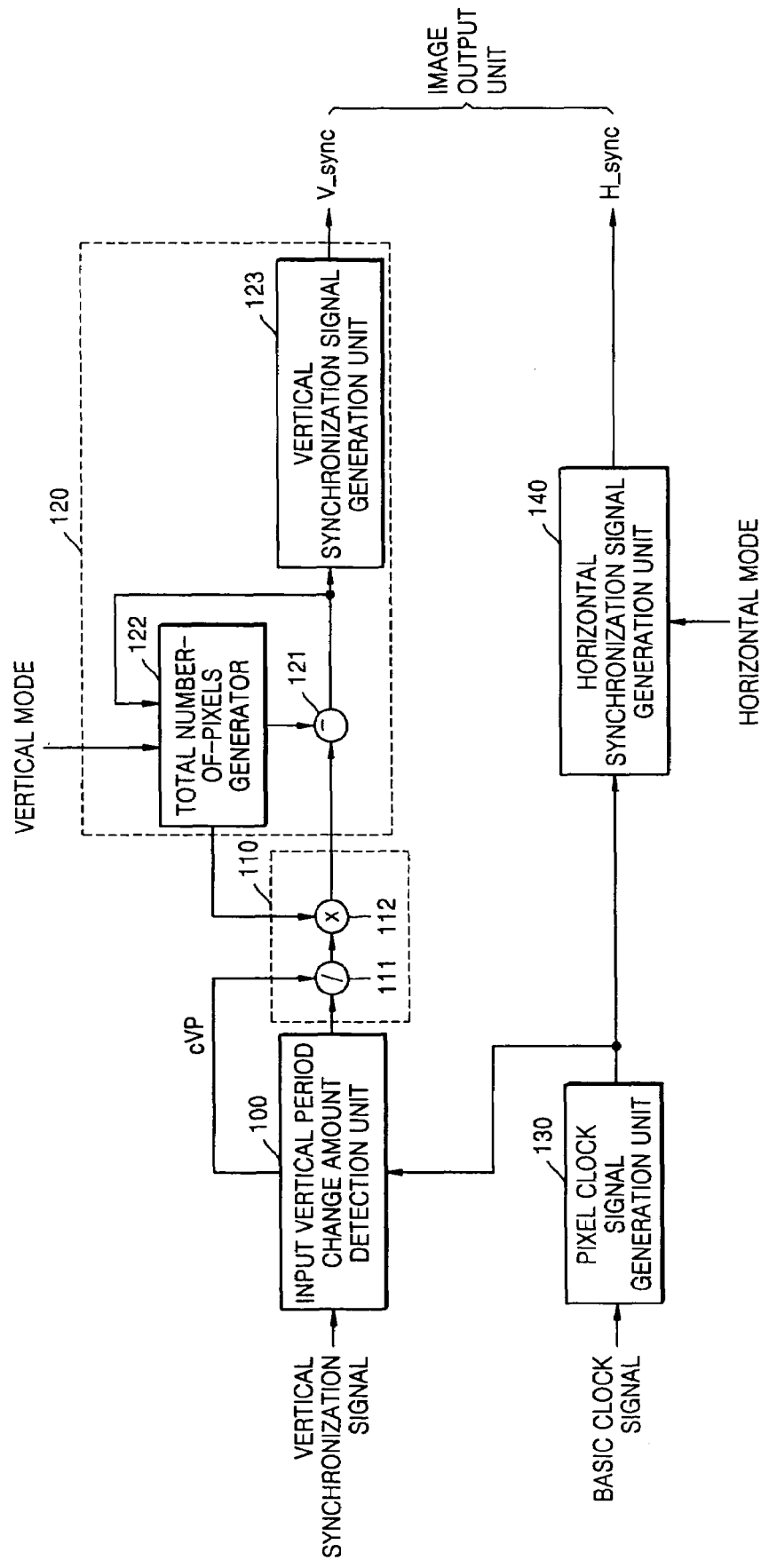
FIG. 1 is a functional block diagram of a display synchronization signal generation apparatus according to an exemplary embodiment of the present invention.

DETAILED DESCRIPTION OF THE ILLUSTRATIVE, NON-LIMITING EMBODIMENTS OF THE INVENTION

The present invention will now be described more fully with reference to the accompanying drawings, in which exemplary embodiments of the invention are shown. Throughout the drawings, like reference numerals refer to like elements.

FIG. 1 is a functional block diagram of a display synchronization signal generation apparatus according to the present invention. Referring to FIG. 1, the display synchronization signal generation apparatus includes an input vertical period change amount detection unit 100, a change amount conversion unit 110, a vertical synchronization signal generation unit 120, a pixel clock signal generation unit 130, and a horizontal synchronization signal generation unit 140.

The input vertical period change amount detection unit 100 detects the amount of change in a vertical period of a received video signal by comparing a current vertical period cVP of the received video signal with a previous vertical period pVP of the received video signal.

Figure 2:
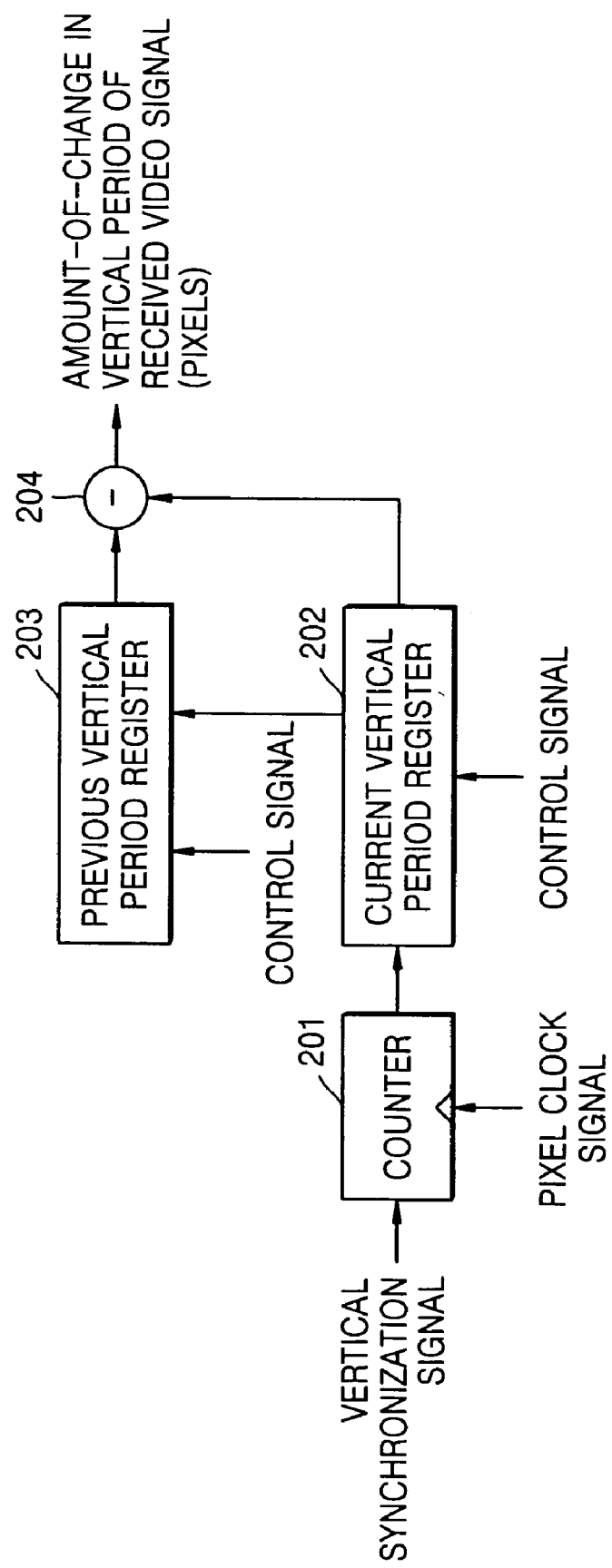
FIG. 2 is a detailed block diagram of an input vertical period change amount detection unit of FIG. 1.

To this end, the input vertical period change amount detection unit 100 can be configured as shown in FIG. 2. Referring to FIG. 2, the input vertical period change amount detection unit 100 includes a counter 201, a current vertical period register 202, a previous vertical period register 203, and a subtractor 204.

The counter 201 counts the number of pixel clocks during a vertical period of the received video signal. Each pixel clock signal is used to output the received video signal according to timing suitable for a display device (not shown) and has a frequency that satisfies operating conditions of the display device (not shown). Thus, the pixel clock signal is also called a display pixel clock signal.

The current vertical period register 202 stores a count value of the counter 201 as current vertical period data of the received video signal every time the vertical synchronization signal of the received video signal is input to the counter 201. Such an operation of the current vertical period register 202 means that the current vertical period data stored in the current vertical period register 202 is updated every time the vertical synchronization signal of the received video signal is input to the counter 201.

To this end, a control signal for notifying the input of the vertical synchronization signal of the received video signal is input to the current vertical period register 202. The control signal may be provided from a functional block (not shown) that is capable of determining the input (or detection) of the vertical synchronization signal of the received video signal. The functional block may be a central control unit included in the analog video signal receiver. Alternatively, the vertical synchronization signal of the received video signal input to the counter 201 may be used as the control signal.

The previous vertical period register 203 stores previous vertical period data of the received video signal. The previous vertical period register 203 updates the previous vertical period data using the current vertical period data stored in the current vertical period register 202 every time the amount of change in the vertical period of the received video signal is detected and output. Here, the current vertical period data stored in the current vertical period register 202 is provided to and stored in the previous vertical period register 203.

To update the previous vertical period data, a control signal for notifying the output of the amount of change in the vertical period of the received video signal is input to the previous vertical period register 203. The control signal may be provided from a central control unit of the analog video signal receiver or generated using an output signal of the subtractor 204.

The subtractor 204 compares the current vertical period data stored in the current vertical period register 202 with the previous vertical period data stored in the previous vertical period register 203 and detects the difference between them. The detected difference is output as the amount of change in the vertical period of the received video signal.

Thus, since the input vertical period change amount detection unit 100 uses the current vertical period data detected by using the counted number of display pixel clocks, an output signal of the input vertical period change amount detection unit 100 is in units of pixels.

The change amount conversion unit 110 converts the amount of change in the vertical period of the received video signal into an amount of change in a vertical period of a video signal to be displayed, using the current vertical period data and the total number of pixels per current frame of the received video signal. To this end, the change amount conversion unit 110 includes a divider 111 and a multiplier 112.

The divider 111 divides the amount of change in the vertical period of the received video signal, which is output from the input vertical period change amount detection unit 100, by the current vertical period data provided from the input vertical period change amount detection unit 100.

The multiplier 112 multiplies the result of the division and the total number of pixels per current frame and outputs the result of the multiplication. A signal output from the multiplier 112 is the amount of change in the vertical period of the video signal to be displayed.

The vertical synchronization signal generation unit 120 generates a vertical synchronization signal of the video signal to be displayed, by using the result of changing the total number of pixels per current frame by the amount of change in the vertical period of the video signal to be displayed, which is provided from the change amount conversion unit 110. To this end, the vertical synchronization signal generation unit 120 includes an arithmetic unit 121, a total number-of-pixels generator 122, and a vertical synchronization signal generator 123.

The arithmetic unit 121 changes the total number of pixels per frame of the display device (not shown), provided from the total number-of-pixels generator 122, by the amount of change in the vertical period of the video signal to be displayed, which is provided from the change amount conversion unit 110, and then outputs the result of the change. In FIG. 1, the arithmetic unit 121 is a subtractor. However, the arithmetic unit 121 may be an adder because the total number of pixels, output from the arithmetic unit 121, may also be increased by the amount of change in the vertical period of the video signal to be displayed, when compared with the total number of pixels per frame, provided from the total number-of-pixels generator 122.

The total number-of-pixels generator 122 generates the total number of pixels per frame. The total number-of-pixels generator 122 initially generates the total number of pixels per frame that is determined according to a predetermined vertical mode. Once the changed total number of pixels per frame is output from the arithmetic unit 121, the total number of pixels generator 122 updates the previously stored total number of pixels per frame using the changed total number of pixels per frame, and generates the updated total number of pixels per frame.

The predetermined vertical mode may be set to be programmable according to operating conditions of the display device (not shown) on which the video signal is to be displayed. The predetermined vertical mode may be set by using V-total, which denotes the total number of lines per frame and includes all lines assigned to V addressable, V bottom border, V FP(odd field), V sync, V BP(odd field), and V top border.

The vertical synchronization signal generator 123 generates a vertical synchronization signal V_sync of the video signal to be displayed, based on the total number of pixels per frame output from the arithmetic unit 121. This operation of the vertical synchronization signal generator 123 means that a period of the vertical synchronization signal V_sync output from the vertical synchronization signal generator 123 is determined by the total number of pixels per frame, output from the arithmetic unit 121.

The pixel clock signal generation unit 130 generates the display pixel clock signal based on a preset basic clock signal. The generated display pixel clock signal has a frequency that satisfies the operating conditions of the display device (not shown) on which the video signal is to be displayed.

Figure 3:
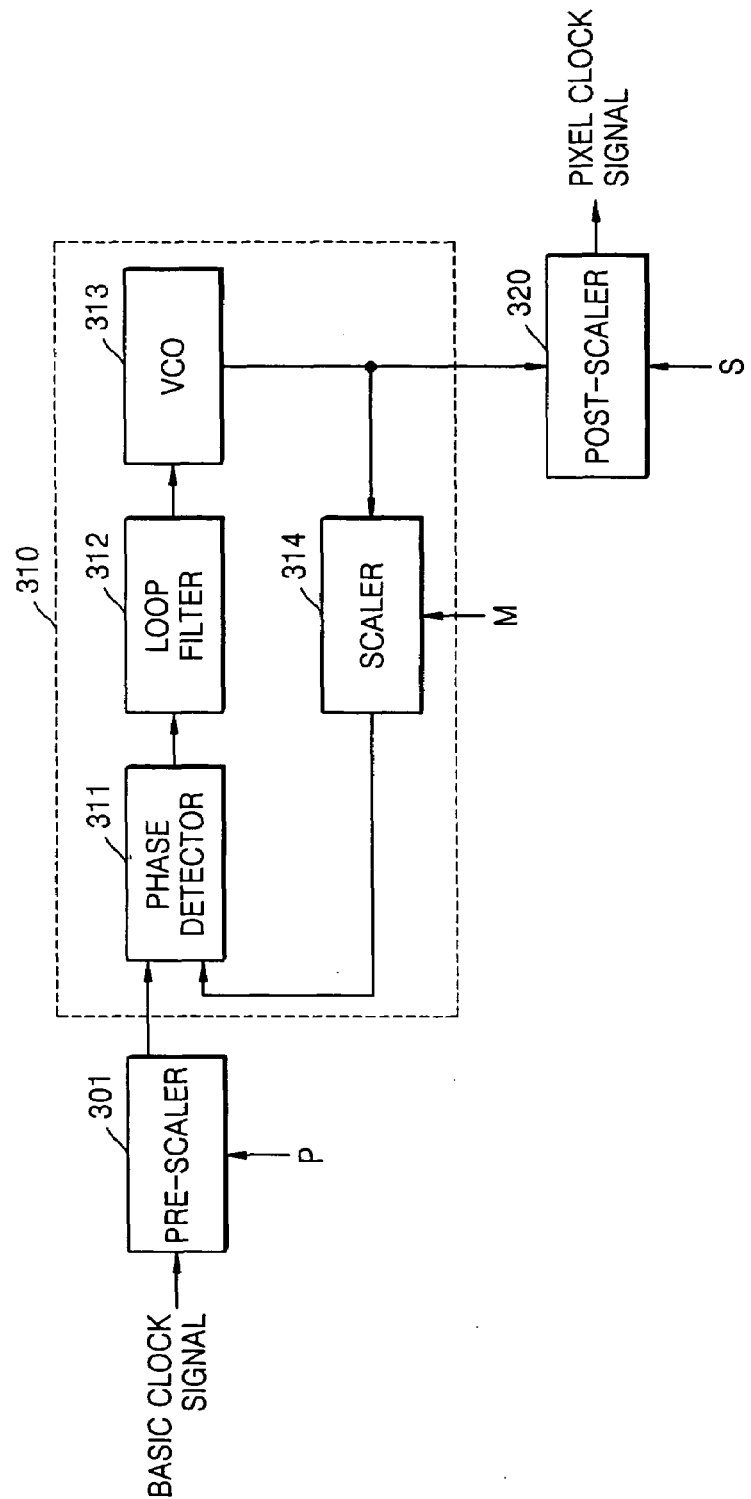
FIG. 3 is a detailed block diagram of a pixel clock signal generation unit of FIG. 1.

The pixel clock signal generation unit 130 performs multiple scaling to generate a pixel clock signal of a desired frequency. To this end, as shown in FIG. 3, the pixel clock signal generation unit 130 includes a pre-scaler 301, a phase locked loop 310, and a post-scaler 320.

The pre-scaler 301 scales an input basic clock signal using a first scaling coefficient P. The pre-scaler 301 may be implemented as a divider.

The phase locked loop 310 maintains phase-locking between an output frequency scaled using a second scaling coefficient M and the scaled basic clock signal output from the pre-scaler 301.

The phase locked loop 310 includes a phase detector 311, a loop filter 312, a voltage control oscillator (VCO) 313, and a scaler 314. The phase detector 311 detects a phase difference between the scaled basic clock signal output from the pre-scaler 301 and the output frequency scaled using the second scaling coefficient M by the scaler 314. The loop filter 312 outputs a control voltage in which frequency components of the input phase difference are limited. The VCO 313 oscillates at a frequency corresponding to the control voltage output from the loop filter 312. A signal output from the VCO 313 is phase-locked to a signal output from the pre-scaler 301. The frequency oscillated from the VCO 313 is provided to the scaler 314. The scaler 314 scales the oscillated frequency using the second scaling coefficient M and then outputs the result of the scaling.

The post-scaler 320 scales the frequency output from the VCO 313 of the phase locked loop 310 using a third scaling coefficient S and outputs the result of the scaling as a pixel clock signal.

The basic clock signal, the first scaling coefficient P, the second scaling coefficient M, and the third scaling coefficient S may be set to be programmable. Also, to accurately generate a pixel clock signal of a frequency that satisfies the operating conditions of the display device (not shown), the basic clock signal, the first scaling coefficient P, the second scaling coefficient M, and the third scaling coefficient S may be set based on operating conditions of the display device (not shown). This means that operating conditions of the pixel clock signal generation unit 130 may be set to be programmable according the operating conditions of the display device (not shown).

The pixel clock signal output from the post-scaler 320 is provided to the input vertical period change amount detection unit 110 and the horizontal synchronization signal generation unit 140.

Based on the predetermined horizontal mode, the horizontal synchronization signal generation unit 140 generates a horizontal synchronization signal that varies according to an input display pixel clock signal, as a horizontal synchronization signal H_sync of the video signal to be displayed. The predetermined horizontal mode may be set using H-to-tal, which denotes the total number of pixels per frame and includes all pixels assigned to H addressable, H right border, H front porch, H sync, H back porch, and H left border. The predetermined horizontal mode may be set to be programmable according to operating conditions of the display device (not shown).

Figure 4:
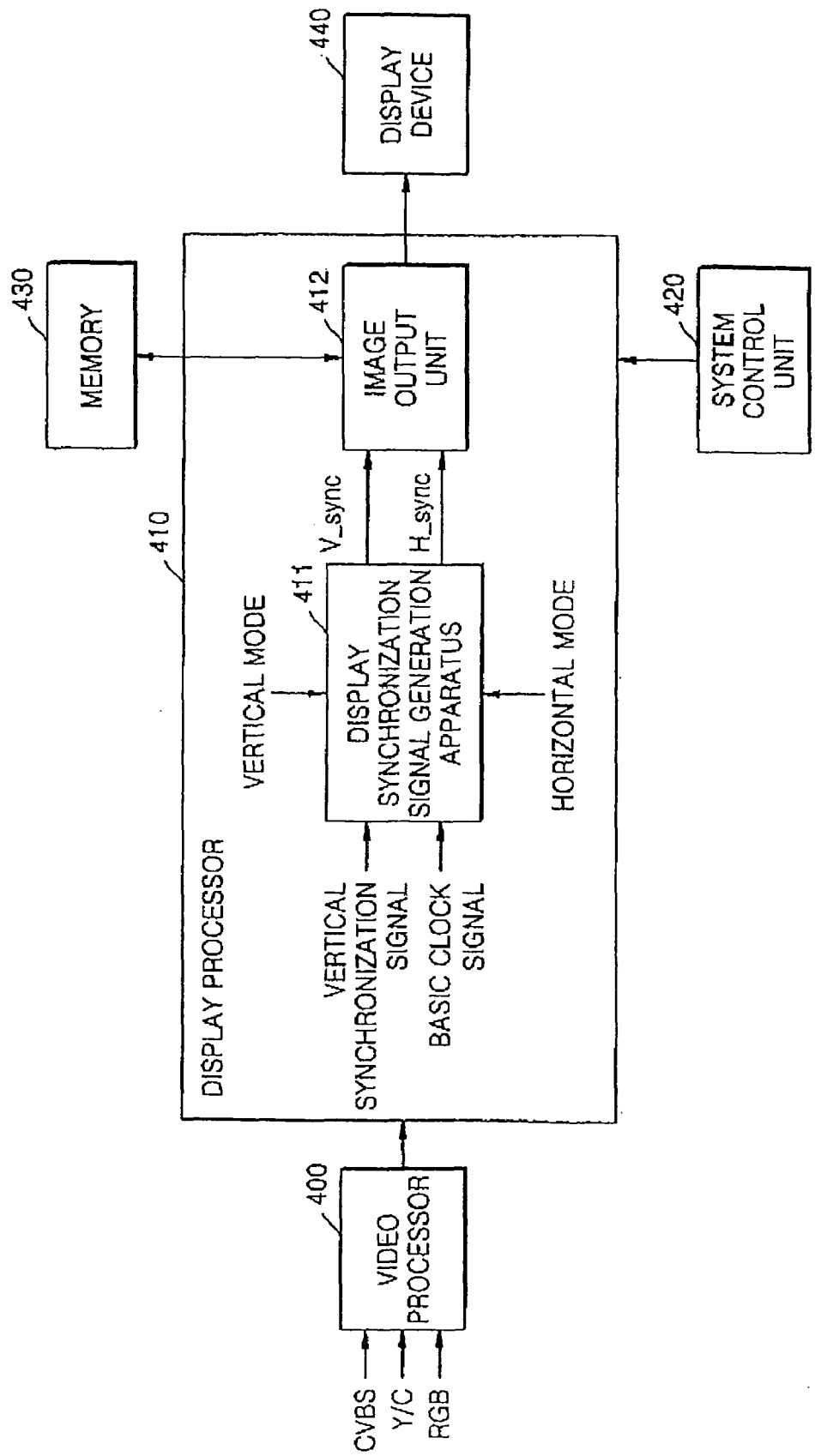
FIG. 4 is a block diagram of an analog video signal receiver including a display synchronization signal generation apparatus according to an exemplary embodiment of the present invention.

FIG. 4 is a block diagram of an analog video signal receiver including a display synchronization signal generation apparatus according to an exemplary embodiment of the present invention. Referring to FIG. 4, the analog video signal receiver includes a video processor 400, a display processor 410, a system control unit 420, a memory 430, and a display device 440.

Once an analog video signal, which is a CVBS signal, is input, the video processor 400 separates the received analog video signal into Y/C/Sync signals, separates the C signal into U/V signals, transforms the resulting signals into ITU-R 656 or ITU-R 601 format, and outputs a digital video signal.

When an input analog video signal is an S-video signal including the Y signal and the C signal, the video processor 400 isolates a Sync signal from the Y signal, separates the C signal into the U/v signals, transforms the resulting signals into the ITU-R 565 or ITU-R 601 format, and outputs a digital video signal.

When the input analog video signal is a component signal, the video processor 400 isolates the Sync signal from the Y signal, transforms the resulting signals into the ITU-R 565 or ITU-R 601 format, and outputs a digital video signal.

The display processor 410 scales up or down an input digital video signal to a resolution suitable for the display device 440. To this end, the display processor 410 includes an image output unit 412 and a display synchronization signal generation apparatus 411 that generates the vertical synchronization signal V_sync and the horizontal synchronization signal H_sync of the video signal to be displayed on the display device 440.

The display synchronization signal generation apparatus 411 is configured as shown in FIG. 1. Thus, the display synchronization signal generation apparatus 411 generates the vertical synchronization signal V_sync and the horizontal synchronization signal H_sync of the video signal to be displayed, using the vertical synchronization signal of the received video signal, the basic clock signal, and the programmable vertical and horizontal modes, as shown in FIG. 1.

Once the vertical synchronization signal V_sync and the horizontal synchronization signal H_sync are generated from the display synchronization signal generation apparatus 411, the image output unit 412 reads image data stored in the memory 430 using horizontal and vertical timing signals V_back porch, V_sync width, V_front porch, H_back porch, H_sync width, and H_front porch that are provided from the system control unit 420, the horizontal synchronization signal H_sync, and the vertical synchronization signal V_sync. Then the image output unit 412 outputs the read image data to the display device 440. The function of the system control unit 420 that provides the horizontal and vertical timing signals may be integrated into the display processor 410.

The display device 440, such as a liquid crystal display (LCD) or a plasma display panel (PDP), receives digital RGB signals from the display processor 410 and displays the received digital RGB signals.

The system control unit 420 corresponds to a central control unit of the analog video signal receiver. The memory 430 stores the video signal to be displayed.

FIG. 5 is a flowchart of the procedure for detecting the amount of change in the vertical period of the received analog video signal, in a display synchronization signal generation method according to an exemplary embodiment of the present invention.

In operation 501, a display pixel clock signal is generated based on a predetermined basic clock signal as shown in the pixel clock signal generation unit 130 of FIG. 1. The display pixel clock signal has a frequency that satisfies operating conditions of the display device 440.

In operation 502, the number of display pixel clocks generated during the vertical period of an input video signal is counted.

In operation 503, the counted number of display pixel clocks is stored as current vertical period data every time the vertical synchronization signal of the input video signal is input.

In operation 504, a current vertical period and a previous vertical period of the input video signal are compared, the difference between the current vertical period and the previous vertical period is detected, and the detected difference is output as the amount of change in the vertical period of the input video signal.

In operation 505, once the amount of change in the vertical period of the input video signal is detected, the previous vertical period data is updated using the current vertical period data stored in operation 503.

In operation 506, the counted number of display pixel clocks is reset and the process returns to operation 501.

FIG. 6 is a flowchart of the procedure for generating the vertical synchronization signal of the video signal to be displayed, in the display synchronization signal generation method according to an exemplary embodiment of the present invention.

In operation 601, the amount of change in the vertical period of the video signal to be displayed is obtained. Here, the amount of change in the vertical period of the input video signal, which is obtained in operation 504, is converted into the amount of change in the vertical period of the video signal to be displayed, using the current vertical period and the total number of pixels per current frame. To be more specific, the amount of change in the vertical period, detected in operation 504, is divided by the current vertical period data, the result of the division and the total number of pixels per current frame are multiplied, and the result of the multiplication is the amount of change in the vertical period of the video signal to be displayed.

In operation 602, the total number of pixels per current frame is changed by the amount of change in the vertical period of the video signal to be displayed, which is obtained in operation 601, and the vertical synchronization signal of the video signal to be displayed is generated based on the changed total number of pixels per current frame.

The horizontal synchronization signal of the video signal to be displayed is generated to vary according to the display pixel clock signal generated in operation 501. Here, a horizontal mode may be set to be programmable according to operating conditions of the display device, as shown in FIG. 1.

According to the present invention, the analog video signal receiver fixes the period of the horizontal synchronization signal provided to the display device and the period of the display pixel clock signal, and varies the vertical period of the video signal to be displayed according to the vertical period of the received analog video signal, thereby displaying a stable image. Thus, it is possible to prevent an unstable display screen such as a horizontally wavy, flickering, or blank screen.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A display synchronization signal generation apparatus comprising:
   a detection unit that detects an amount of change in a vertical period of an input video signal by comparing a current vertical period and a previous vertical period of the input video signal;
   a change amount conversion unit that converts the amount of change detected by the detection unit into an amount of change in a vertical period of a video signal to be displayed, based on the current vertical period of the input video signal and a total number of pixels per frame; and
   a vertical synchronization signal generation unit that generates a vertical synchronization signal of the video signal to be displayed, based on a result of changing the total number of pixels per frame by the amount of change that has been converted by the change amount conversion unit.

2. The display synchronization signal generation apparatus of claim 1, wherein the detection unit detects the current vertical period of the input video signal, based on a counted number of display pixel clocks of the video signal to be displayed.

3. The display synchronization signal generation apparatus of claim 1, wherein the detection unit comprises:
   a counter that counts a number of display pixel clocks of the video signal to be displayed during the vertical period of the input video signal;
   a first register that stores a count value of the counter as current vertical period data every time the vertical synchronization signal of the input video signal is input;
   a second register that stores previous vertical period data and updates the previous vertical period data based on the current vertical period data stored in the first register; and
   a subtractor that detects a difference between the current vertical period data stored in the first register and the previous vertical period data stored in the second register and outputs the difference as the amount of change in the vertical period of the input video signal.

4. The display synchronization signal generation apparatus of claim 1, wherein the change amount conversion unit comprises:
   a divider that divides the amount of change detected by the detection unit by the current vertical period of the input video signal; and
   a multiplier that multiplies the result of the dividing and the total number of pixels per frame and outputs the result of the multiplying as the amount of change in the vertical period of the video signal to be displayed.

5. The display synchronization signal generation apparatus of claim 1, wherein the vertical synchronization signal generation unit comprises:
   an arithmetic unit that changes the total number of pixels per frame by the amount of change in the vertical period of the video signal to be displayed that is provided from the change amount conversion unit;
   a total-number-of-pixels generator that initially generates the total number of pixels per frame according to a vertical mode, updates the total number of pixels per frame into an output of the arithmetic unit, and generates an updated total number of pixels per frame; and
   a vertical synchronization signal generator that generates the vertical synchronization signal of the video signal to be displayed, based on the total number of pixels per frame, which is output from the arithmetic unit.

6. The display synchronization signal generation apparatus of claim 1, wherein the vertical mode is set to be programmable according to operating conditions of a display device to display the video signal.

7. The display synchronization signal generation apparatus of claim 1, wherein the input video signal is an analog video signal.

8. A display synchronization signal generation apparatus comprising:
   a pixel clock signal generation unit that generates a display pixel clock signal based on a basic clock signal;
   a horizontal synchronization signal generation unit that generates a horizontal synchronization signal that varies according to the display pixel clock signal generated by the pixel clock signal generation unit, and outputs the horizontal synchronization signal as a horizontal synchronization signal of a video signal to be displayed;
   a detection unit that detects a current vertical period of an input video signal by using the display pixel clock signal generated by the pixel clock signal generation unit, compares the current vertical period and a previous vertical period of the input video signal, and detects an amount of change in a vertical period of the input video signal;
   a change amount conversion unit that converts the amount of change detected by the detection unit into an amount of change in a vertical period of a video signal to be displayed, based on the current vertical period of the input video signal and a total number of pixels per frame; and
   a vertical synchronization signal generation unit that generates a vertical synchronization signal of the video signal to be displayed, based on a result of changing the total number of pixels per frame by the amount of change that has been converted by the change amount conversion unit.

9. The display synchronization signal generation apparatus of claim 8, wherein the horizontal synchronization signal generation unit generates the horizontal synchronization signal that varies according to the display pixel clock signal, according to a horizontal mode set to be programmable according to operating conditions of a display device to display the video signal.

10. The display synchronization signal generation apparatus of claim 8, wherein the basic clock signal and operating conditions of the pixel clock signal generation unit are set to be programmable according to the operating conditions of a display device to display the video signal.

11. A display synchronization signal generation method in a video signal receiver, the display synchronization signal generation method comprising:

detecting a difference between a current vertical period and a previous vertical period of an input video signal as an amount of change in a vertical period of the input video signal;

converting the detected amount of change into an amount of change in a vertical period of a video signal to be displayed, based on the current vertical period and a total number of pixels per frame; and generating a vertical synchronization signal of the video signal to be displayed, based on a result of changing the total number of pixels per frame by the amount of change in the vertical period of the video signal to be displayed.

12. The display synchronization signal generation method of claim 11, wherein the detecting of the amount of change in the vertical period of the input video signal comprises detecting the current vertical period based on a counted number of display pixel clocks of a display device included in the video signal receiver.

13. The display synchronization signal generation method of claim 11, wherein the detecting of the amount of change in the vertical period of the input video signal further comprises:

counting a number of display pixel clocks of a display device included in the video signal receiver during activation of the vertical synchronization signal of the input video signal;

storing the counted number of display pixel clocks as current vertical period data every time the vertical synchronization signal of the input video signal is input;

detecting a difference between the current vertical period data and previous vertical period data and outputting the difference as the amount of change in the vertical period of the input video signal; and updating the previous vertical period data and resetting the counted number of display pixel clocks, if the amount of change in the vertical period of the input video signal is output.

14. The display synchronization signal generation method of claim 11, wherein the converting of the detected amount of change comprises:

dividing the detected amount of change by the current vertical period data; and multiplying a result of the dividing and the total number of pixels per frame and outputting a result of the multiplying as the amount of change in the vertical period of the video signal to be displayed.

15. A display synchronization signal generation method comprising:

generating a display pixel clock signal based on a basic clock signal;

counting a number of display pixel clocks generated during activation of a vertical synchronization signal of an input video signal;

storing the counted number of display pixel clocks as current vertical data every time the vertical synchronization signal of the input image is input;

detecting an amount of change in a vertical period of the input video signal by comparing the current vertical period data and previous vertical period data of the input video signal;

converting the detected amount of change into the amount of change in a vertical period of a video signal to be displayed, based on the current vertical period data and the total number of pixels per frame;

generating a vertical synchronization signal of the video signal to be displayed, based on a result of changing the total number of pixels per frame by the converted amount of change; and generating a horizontal synchronization signal that varies according to the display pixel clock signal, as a horizontal synchronization signal of the video signal to be displayed.

* * * * *